(12) United States Patent
McGrath et al.

(10) Patent No.: US 7,493,014 B2
(45) Date of Patent: Feb. 17, 2009

(54) REPLAYING VIDEO INFORMATION

(75) Inventors: Mark John McGrath, Bracknell (GB); Andrew Kydd, Berlin (DE); Jonathan Thorpe, Winchester (GB)

(73) Assignee: Sony United Kingdom Limited, Weybridge (GB)

( * ) Notice: Subject to any disclaimer, the term of this patent is extended or adjusted under 35 U.S.C. 154(b) by 1636 days.

(21) Appl. No.: 10/006,434

(22) Filed: Dec. 6, 2001

(65) Prior Publication Data

US 2002/0141733 A1 Oct. 3, 2002

(30) Foreign Application Priority Data

Dec. 7, 2000 (GB) .................................. 0029861.2

(51) Int. Cl.
    *H04N 5/91* (2006.01)
(52) U.S. Cl. ........................... 386/68; 386/95; 386/112
(58) Field of Classification Search .................. 386/46, 386/95, 111, 112, 68, 83
    See application file for complete search history.

(56) References Cited

U.S. PATENT DOCUMENTS

| 5,479,303 | A |   | 12/1995 | Suzuki et al. |        |
|-----------|---|---|---------|---------------|--------|
| 5,546,191 | A | * | 8/1996  | Hibi et al.   | 386/83 |
| 5,805,733 | A |   | 9/1998  | Wang et al.   |        |
| 5,835,667 | A |   | 11/1998 | Wactlar et al.|        |
| 5,956,026 | A | * | 9/1999  | Ratakonda     | 715/723|
| 6,163,510 | A | * | 12/2000 | Lee et al.    | 386/55 |
| 6,728,473 | B1| * | 4/2004  | Chotoku et al.| 386/95 |
| 6,788,878 | B1| * | 9/2004  | Fujii et al.  | 386/68 |

FOREIGN PATENT DOCUMENTS

| EP | 0 877 378   | 11/1998 |
|----|-------------|---------|
| EP | 0 893 923   | 1/1999  |
| EP | 0 977 172   | 2/2000  |
| EP | 1043664     | 10/2000 |
| GB | 1603828     | 12/1981 |
| GB | 2 343 053   | 4/2000  |
| WO | WO 96/12240 | 4/1996  |

OTHER PUBLICATIONS

Kanada T: "Immersion Into Visual Media: New Applications of Image Understanding" IEEE Expert, IEEE Inc. New York, US, vol. 1, No. 1, Feb. 1996, pp. 73-80, XP000585056 ISSN: 0885-9000.

(Continued)

*Primary Examiner*—Huy Nguyen
(74) *Attorney, Agent, or Firm*—Oblon, Spivak, McClelland, Maier & Neustadt, P.C.

(57) ABSTRACT

A video replay apparatus including a content storage device, a replay controller configured to control a replay of video material from the content storage device, the replay controller being configured to control the replay in accordance with metadata associated with the video material, the metadata defining an information content of the video material and defining an information event within the video material as a threshold change in the information content, and the replay controller is further configured to replay the video material with a pre-defined number of information events in a unit of time in a replayed sequence.

9 Claims, 5 Drawing Sheets

OTHER PUBLICATIONS

Charlesworth J P A et al: "Spoken Content Metadata and MPEG-7" Proceedings ACM Multimedia 2000 Workshops. Marina Del Rey, CA, Nov. 4, 2000, ACM International Multimedia Conference, New York, NY : ACM, US, vol. CONF. 8, Nov. 4, 2000, pp. 81-84, XP001003699 ISBN: 1-58113-311-1.

"International Conference on Consumer Electronics. 19th In the Series", published Jun. 13-15, 2000 IEEE pp. 344-345 Wensheng and Vellaikal, "Video analysis and classification for MPEG-7 applications".

IEEE Multimedia, Jan. to Mar. 1999, Satoh, Nakamura and Kanade, "Name-It: Naming and Detecting Faces in News Videos", pp. 22-35.

"Proceedings of IEEE and Computer Society Conference on Computer Vision and Pattern Recognition", published 1997, IEEE pp. 61-70, Michael Smith and Takeo Kanade "Video skimming and characterization through the combination of image and language understanding".

* cited by examiner

REPLAYING VIDEO INFORMATION

BACKGROUND OF THE INVENTION

1. Field of the Invention

The present invention relates to the field of replaying video information.

2. Description of the Prior Art

Video cameras produce audio and video footage that will typically be extensively edited before a broadcast quality programme is finally produced. The editing process can be very time consuming and therefore accounts for a significant fraction of the production costs of any programme.

Video images and audio data will often be edited "off-line" on a computerbased digital non-linear editing apparatus. A non-linear editing system provides the flexibility of allowing footage to be edited starting at any point in the recorded sequence. The images used for digital editing are often a reduced resolution copy of the original source material which, although not of broadcast quality, is of sufficient quality for browsing the recorded material and for performing off-line editing decisions. The video images and audio data can be edited independently.

The end-product of the off-line editing process is an edit decision list (EDL). The EDL is a file that identifies edit points by their timecode addresses and hence contains the required instructions for editing the programme. The EDL is subsequently used to transfer the edit decisions made during the off-line edit to an "on-line" edit in which the master tape is used to produce a high-resolution broadcast quality copy of the edited programme.

The off-line non-linear editing process, although flexible, can be very time consuming. It relies on the human operator to replay the footage in real time, segment shots into sub-shots and then to arrange the shots in the desired chronological sequence. Arranging the shots in an acceptable final sequence is likely to entail viewing the shot, perhaps several times over, to assess its overall content and consider where it should be inserted in the final sequence.

The audio data could potentially be automatically processed at the editing stage by applying a speech detection algorithm to identify the audio frames most likely to contain speech. Otherwise the editor must listen to the audio data in real time to identify its overall content.

Essentially the editor has to start from scratch and to replay the raw audio frames and video images and painstakingly establish the contents of the footage. Only then can decisions be made on how shots should be segmented and on the desired ordering of the final sequence.

SUMMARY OF THE INVENTION

The invention provides video replay apparatus comprising:
a video material store;
a replay controller for controlling replay of video material from the video material store; and
the replay controller being operable to control replay of video material stored in the store in accordance with associated data defining an information content of the video material.

Various other respective aspects and features of the invention are defined in the appended claims.

The invention addresses the difficulties described above by providing a new way of replaying (e.g. shuttling through) video material. Instead of replaying the video material at a constant (or defined) frame rate, it is replayed in accordance with information data defining an information content of the video material, for example to provide a constant (or user controllable) information rate.

In this way, the user can view the video material, seeing its most important sections in an efficient manner while skimming past sections having a low information content, e.g. sections in which little changes from frame to frame.

Preferably, the information replay rate is under the control of a user control, for example a jog/shuttle wheel. In this case, in a shuttle mode, the angular displacement of the wheel can control the information, rather than the frame, replay rate.

It is noted that a paper by Smith et al, entitled, "Video Skimming for Quick Browsing Based on Audio and Image Characterisation", Tech Report CMU-CS-95-186, Carnegie Mellon Univ,. Pittsburgh, July 1995, discloses the production of a shortened version of a piece of video material in dependence on information content, no disclosure has been made of the idea of allowing a variable information replay rate in accordance with a user control. In contrast to the Smith et al paper, the invention provides a system in which the rate or type of information received by the user can be varied at the time of replay.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
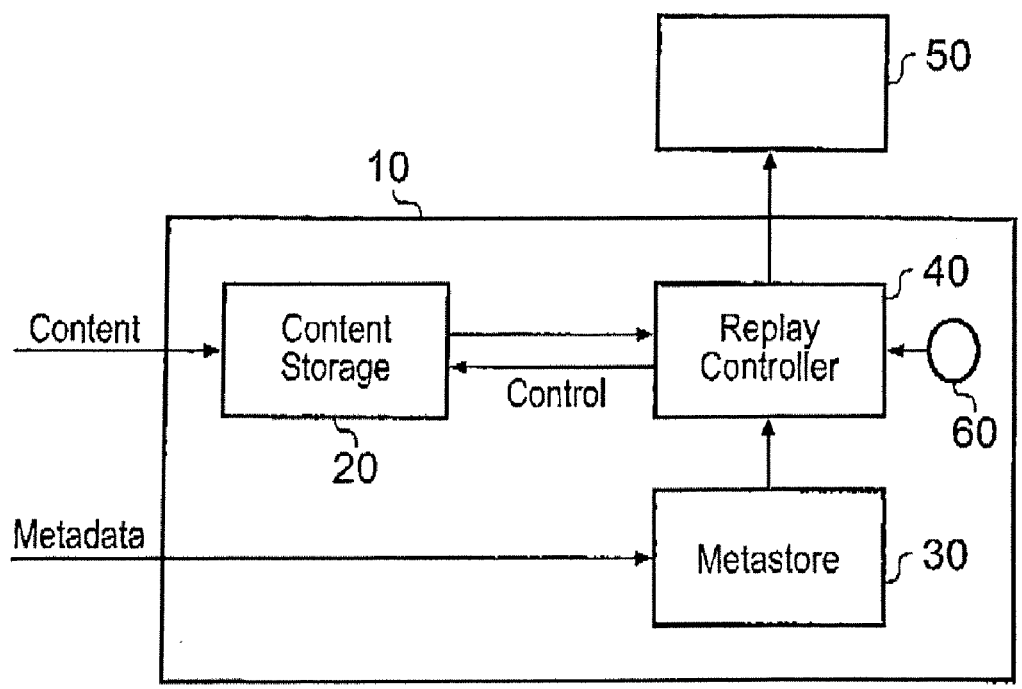
FIG. 1 is a schematic diagram of a first embodiment of a video replay apparatus.

FIG. 1 is a schematic diagram of a first embodiment of a video replay apparatus 10, which may form part of a video record/replay device, a video editing device or the like. The apparatus receives video material (possibly with associated audio material) and stores this in a content storage device 20 such as a tape storage device or (more preferably) a random access storage device such as a hard disk, optical disk or solid state memory. The replay apparatus 10 also receives metadata associated with the video material, and stores this in a "metastore" (metadata store) 30, preferably embodied as a random access storage device such as a hard disk, optical disk or solid state memory. Of course, it is a routine design detail as to whether the content storage and metadata storage are embodied as different devices or different logical partitions within a single storage device.

The derivation and nature of the metadata will be described below, but for the purposes of FIG. 1 it will be appreciated that the metadata, or data derived directly from it, can give an indication of the instantaneous "information" content of the video and/or associated audio material. The term "information" is used here to signify a quality of certain parts of the audio/video material which renders them interesting to a human editor or viewer. So, portions of higher information content might include video scene changes, the appearance of a face (or a new face) in the video material, periods of speech, or the start and finish of such periods, in the associated audio material, or instances of changes of image "activity" (see below). Other measures of "information" content can be derived, for example those discussed in the Smith et al paper referenced above.

A replay controller 40 controls replay of the material stored in the content store 20 onto a viewer display screen or screen window 50. The replay controller 40 is operated under the control of a user control device 60 which in this embodiment includes a "jog/shuttle" wheel but may of course be embodied in a variety of forms such as a keypad, a slider, a mouse-driven pointer or the like, a touch-screen control and so on.

The operation of a jog/shuttle wheel in a conventional replay device such as a video tape recorder is that, when the wheel is set to a "shuttle" mode, the replay direction depends on the direction that the wheel is turned by the user, and the replay speed depends on how far the wheel is turned in that direction. Often a spring return (back to a zero-speed position) is provided. In a "jog" mode, the video is replayed (in either direction) by one frame for every incremental rotation (e.g. 1°)of the wheel.

Often, the user may switch between jog and shuttle modes of operation by simply pressing the wheel.

In the present embodiments, the jog/shuttle wheel operates in a generally analogous manner, but with respect to the speed at which information is replayed or provided to the user, not the speed at which video frames are replayed.

So, in a "shuttle" mode of information replay, the angular displacement of the wheel 60 from the "zero speed" centre position determines the rate at which information is replayed to the user. Of course, the nature of the "information" is to a certain extent subjective, even if the measure of information can then be derived analytically from the material. However, once the measures of information have been set up, the apparatus operates so that periods in the audio/video material in which very little changes or happens (i.e. periods of low information content) will be replayed very quickly, and portions of the material having a higher information content will be replayed more slowly.

In a "jog" mode, rotation of the wheel 60 by the incremental amount causes the material as displayed to move to the next point having a high information content, for example, the next point at which the information measures exceed a certain threshold.

The replay controller can simply read data defining the information content from the metastore, or can instead derive it directly from data stored in the metastore. An example in which the metastore holds the information measure data will be described below, but it is a routine modification to have some of the calculations performed, for example only when needed, by the replay controller.

Figure 2:
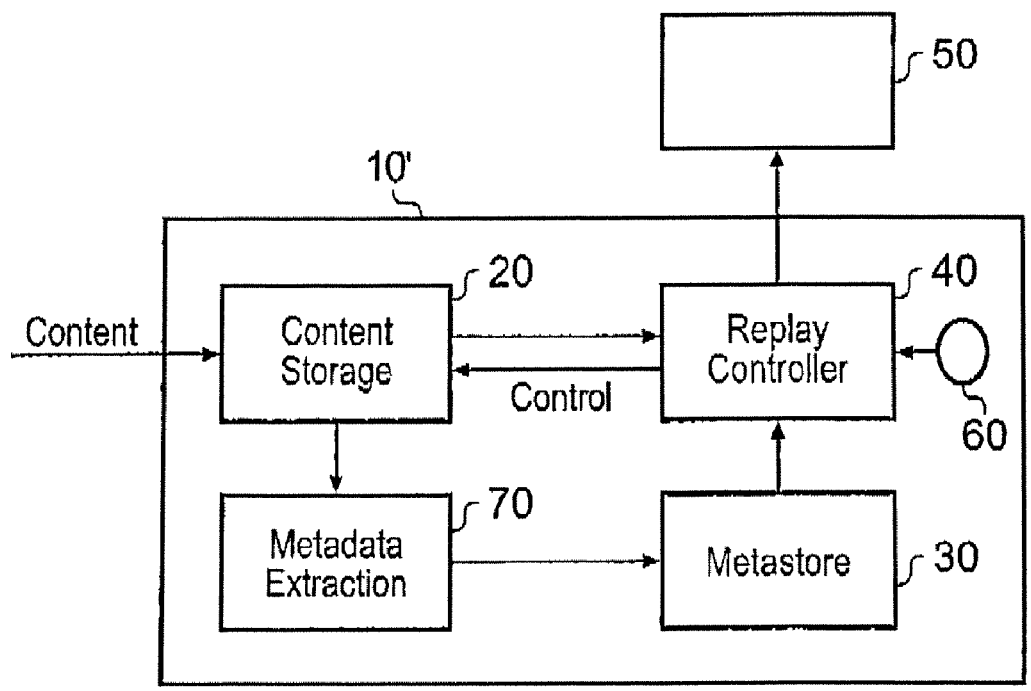
FIG. 2 is a schematic diagram of a second embodiment of a video replay apparatus.

FIG. 2 schematically illustrates a second embodiment of a video replay apparatus 10' which in many respects is similar to the apparatus 10 of FIG. 1. However, in FIG. 2 the metadata extraction is performed by a metadata extractor 70 on the video material stored in the content storage device 20. The techniques used to extract metadata will be described below with reference to FIGS. 3 to 5, in the context of an apparatus of the type shown in FIG. 1. It is a routine modification to employ those same techniques in the metadata extractor 70 of FIG. 2.

Figure 3:
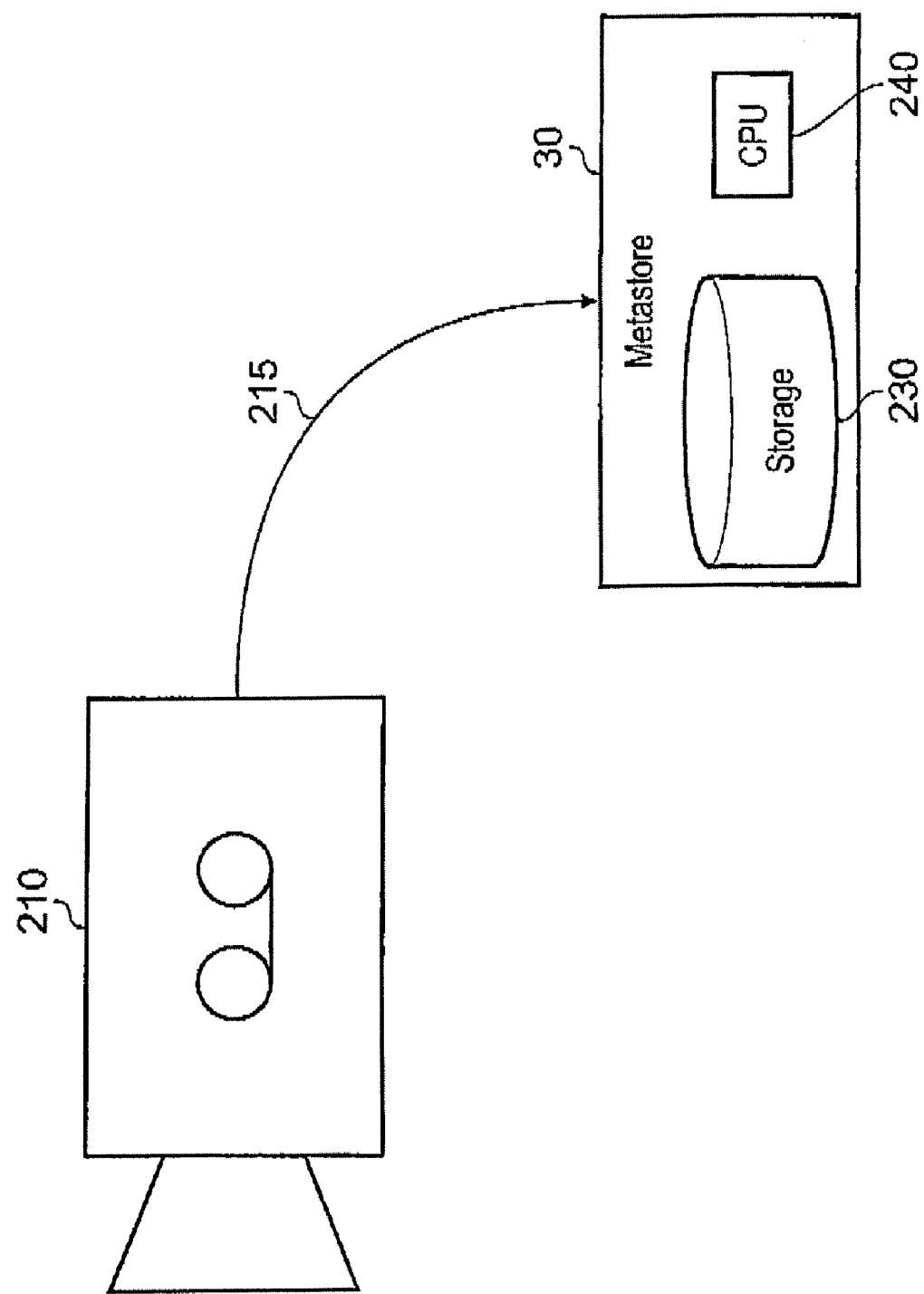
FIG. 3 shows a downstream audio and video processing system.
Figure 4:
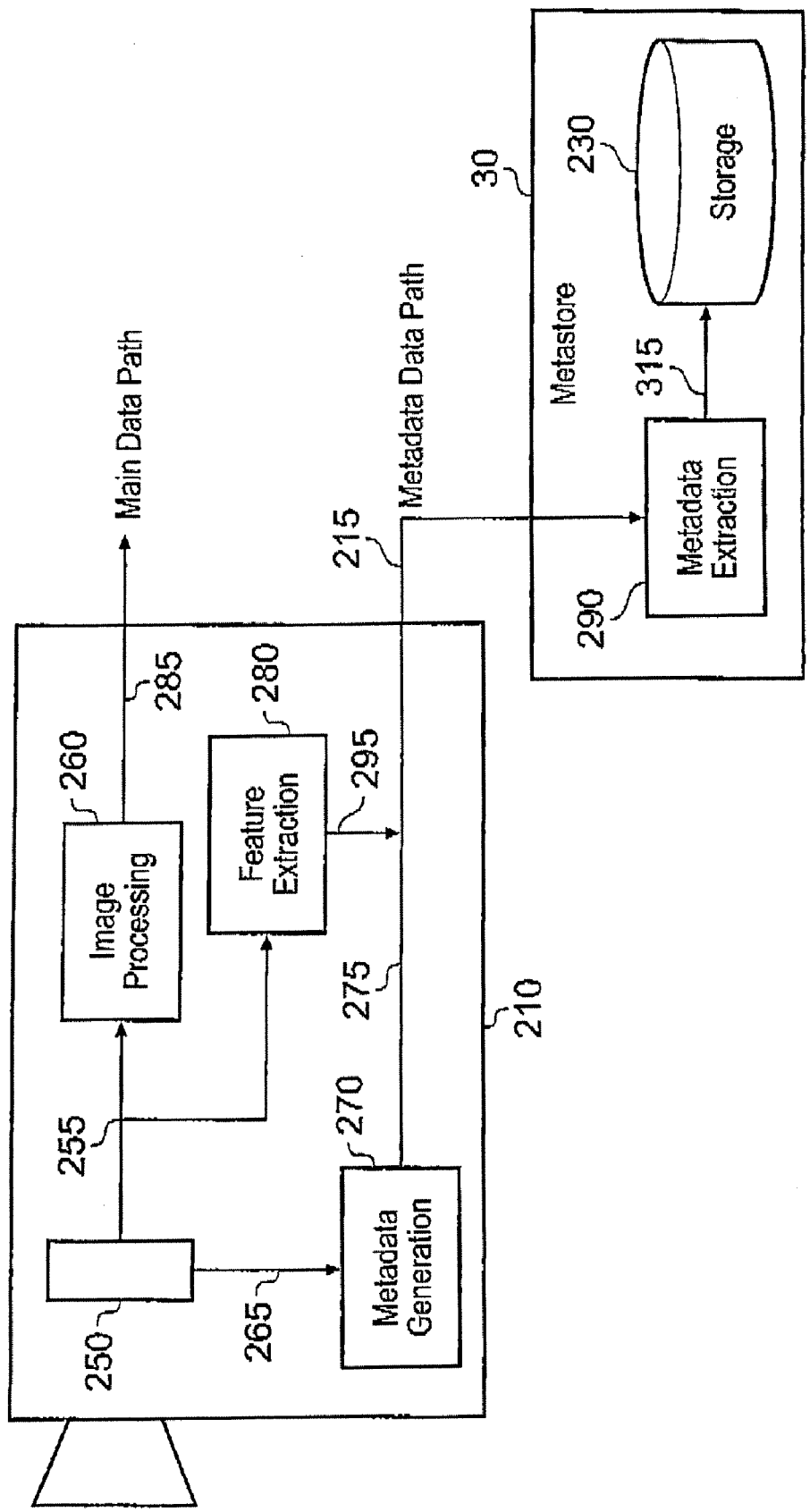
FIG. 4 shows a video camera and metastore.
Figure 5:
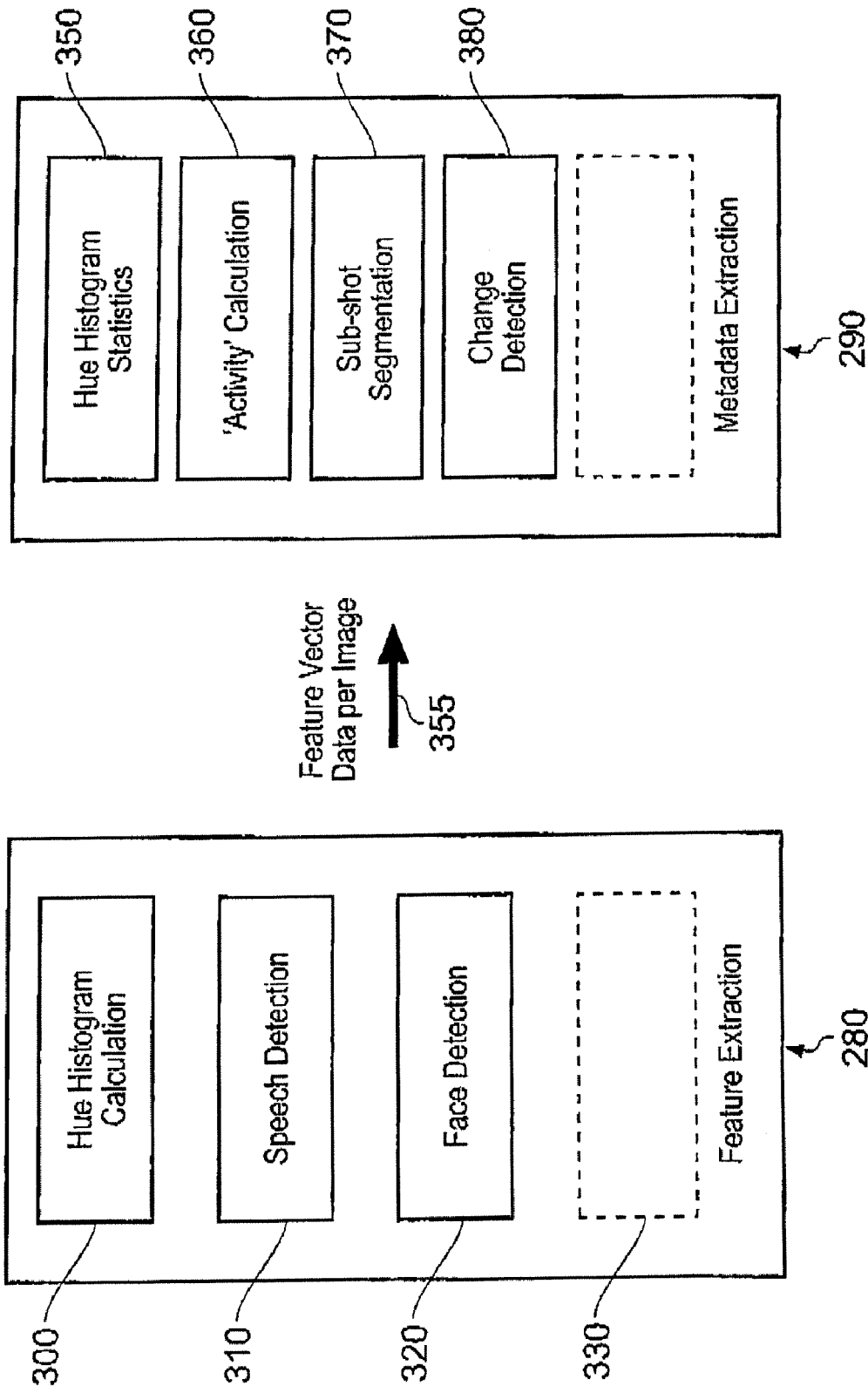
FIG. 5 is a schematic diagram of a feature extraction module and a metadata extraction module.

So, FIGS. 3 to 5 will describe the acquisition of video/audio material and the derivation/extraction of metadata and information data from that material into the metastore 30.

FIG. 3 shows an audio-visual processing system. A camera 210 records audio and video data on video tape in the camera. The camera 210 also produces and records supplementary information about the recorded video footage known as "metadata". This metadata will typically include the recording date, recording start/end flags or timecodes, camera status data and a unique identification index for the recorded material known as an SMPTE UMID.

The UMID is described in the March 2000 issue of the "SMPTE Journal". An "extended UMID" comprises a first set of 32 bytes of "basic UMID" and a second set of 32 bytes of "signature metadata".

The basic UMID has a key-length-value (KLV) structure and it comprises:

A 12-byte Universal Label or key which identifies the SMPTE UMID itself, the type of material to which the UMID refers. It also defines the methods by which the globally unique Material and locally unique Instance numbers (defined below) are created.

A 1-byte length value which specifies the length of the remaining part of the UMID.

A 3-byte Instance number used to distinguish between different "instances" or copies of material with the same Material number.

A 16-byte Material number used to identify each clip. A Material number is provided at least for each shot and potentially for each image frame.

The signature metadata comprises:

An 8-byte time/date code identifying the time of creation of the "Content Unit" to which the UMID applies. The first 4-bytes are a Universal Time Code (UTC) based component.

A 12-byte value which defines the (GPS derived) spatial co-ordinates at the time of Content Unit creation.

3 groups of 4-byte codes which comprise a country code, an organisation code and a user code.

Apart from the basic metadata described above which serves to identify properties of the recording itself, additional metadata is provided which describes in detail, the contents of the recorded audio data and video images. This additional metadata comprises "feature-vectors", preferably on a frame-by-frame basis, and is generated by hardware in the camera 210 by processing the raw video and audio data. in real time as (or immediately after) it is captured.

The feature vectors could for example supply data to indicate if a given frame has speech associated with it and whether or not it represents an image of a face. Furthermore the feature vectors could include information about certain image properties such as the magnitudes of hue components in each frame.

The main metadata, which includes a UMID and start/end timecodes, could be recorded on videotape along with the audio and video data, but preferably it will be stored using a proprietary system such as Sony's "Tele-File®" system. Under this Telefile system, the metadata is stored in a contactless memory integrated circuit contained within the videocassette label which can be read, written and rewritten with no direct electrical contact to the label.

All of the metadata information is transferred to the metastore 30 along a metadata data path 215 which could represent videotape, a removable hard disk drive or a wireless local area network (LAN). The metastore 30 has a storage capacity 230 and a central processing unit 240 which performs calculations to effect full metadata extraction and analysis. The metastore 30 uses the feature-vector metadata: to automate functions such as sub-shot segmentation; to identify footage likely to correspond to an interview as indicated by the simultaneous detection of a face and speech in a series of contiguous frames; to produce representative images for use in an off-line editing system which reflect the predominant overall contents of each shot; and to calculate properties associated with encoding of the audio and video information.

Thus the metadata feature-vector information affords automated processing of the audio and video data prior to editing. Metadata describing the contents of the audio and video data is centrally stored in the metastore 30 and it is linked to the associated audio and video data by a unique identifier such as the SMPTE UMID. The audio and video data will generally be stored independently of the metadata. The use of the metastore makes feature-vector data easily accessible and provides a large information storage capacity.

The metastore also performs additional processing of feature-vector data, automating many processes that would otherwise be performed by the editor. The processed feature-vector data is potentially available at the beginning of the off-line editing process which should result in a much more efficient and less time-consuming editing operation.

FIG. 4 illustrates schematically how the main components of the video camera 210 and the metastore 30 interact according to embodiments of the invention. An image pickup device 250 generates audio and video data signals 255 which it feeds to an image processing module 260. The image processing module 260 performs standard image processing operations and outputs processed audio and video data along a main data path 285. The audio and video data signals 255 are also fed to a feature extraction module 280 which performs processing operations such as speech detection and hue histogram calculation, and outputs feature-vector data 295. The image pickup device 250 supplies a signal 265 to a metadata generation unit 270 that generates the basic metadata information 275 which includes a basic UMID and start/end timecodes. The basic metadata information and the feature-vector data 295 are multiplexed and sent along a metadata data path 215.

The metadata data path directed into a metadata extraction module 290 located in the metastore 30. The metadata extraction module 290 performs full metadata extraction and uses the feature-vector data 295 generated in the video camera to perform additional data processing operations to produce additional information about the content of the recorded sound and images. For example the hue feature vectors can be used by the metadata extraction module 290 (i.e. additional metadata) to perform sub-shot segmentation. This process will be described below. The output data 315 of the metadata extraction module 290 is recorded in the main storage area 230 of the metastore 30 where it can be retrieved by an off-line editing apparatus.

FIG. 5 is a schematic diagram of a feature extraction module and a metadata extraction module according to embodiments of the invention.

As mentioned above, the left hand side of FIG. 5 shows that the feature extraction module 280 of the video camera 210, comprises a hue histogram calculation unit 300, a speech detection unit 310 and a face detection unit 320. The outputs of these feature extraction units are supplied to the metadata extraction module 290 for further processing.

The hue histogram calculation unit 300 performs an analysis of the hue values of each image. Image pick-up systems in a camera detect primary-colour red, green and blue (RGB) signals. These signals are format-converted and stored in a different colour space representation. On analogue video tape (such as PAL and NTSC) the signals are stored in YUV space whereas digital video systems store the signals in the standard YCrCb colour space. A third colour space is hue-saturation-value (HSV). The hue reflects the dominant wavelength of the spectral distribution, the saturation is a measure of the concentration of a spectral distribution at a single wavelength and the value is a measure of the intensity of the colour. In the HSV colour space hue specifies the colour in a 360° range.

The hue histogram calculation unit 300 performs, if so required, the conversion of audio and video data signals from an arbitrary colour space to the HSV colour space. The hue histogram calculation unit 300 then combines the hue values for the pixels of each frame to produce for each frame a "hue histogram" of frequency of occurrence as a function of hue value. The hue values are in the range $0° \leq hue < 360°$ and the bin-size of the histogram, although potentially adjustable, would typically be 1°. In this case a feature vector with 360 elements will be produced for each frame. Each element of the hue feature vector will represent the frequency of occurrence of the hue value associated with that element. Hue values will generally be provided for every pixel of the frame but it is also possible that a single hue value will be derived (e.g. by an averaging process) corresponding to a group of several pixels. The hue feature-vectors can subsequently be used in the metadata extraction module 290 to perform sub-shot segmentation and representative image extraction.

The speech detection unit 310 in the feature extraction module 280 performs an analysis of the recorded audio data. The speech detection unit 310 performs a spectral analysis of the audio material, typically on a frame-by-frame basis. In this context, the term "frame" refers to an audio frame of perhaps 240 milliseconds duration and not to a video frame. The spectral content of each audio frame is established by applying a fast Fourier transform (FFT) to the audio data using either software or hardware. This provides a profile of the audio data in terms of power as a function of frequency.

The speech detection technique used in this embodiment exploits the fact that human speech tends to be heavily harmonic in nature. This is particularly true of vowel sounds. Although different speakers have different pitches in their voices, which can vary from frame to frame, the fundamental frequencies of human speech will generally lie in the range from 50-2500 Hz. The content of the audio data is analysed by applying a series of "comb filters" to the audio data. A comb filter is an Infinite Impulse Response (IIR) filter that routes the output samples back to the input after a specified delay time. The comb filter has multiple relatively narrow passbands, each having a centre frequency at an integer multiple of the fundamental frequency associated with the particular filter. The output of the comb filter based on a particular fundamental frequency provides an indication of how heavily the audio signal in that frame is harmonic about that fundamental frequency. A series of comb filters with fundamental frequencies in the range 50-2500 Hz is applied to the audio data.

When an FFT process is applied to the audio material first, as in this embodiment, the comb filter is conveniently implemented in a simple selection of certain FFT coefficients.

The sliding comb filter thus gives a quasi-continuous series of outputs, each indicating the degree of harmonic content of the audio signal for a particular fundamental audio frequency. Within this series of outputs, the maximum output is selected for each audio frame. This maximum output is known as the "Harmonic Index" (HI) and its value is compared with a predetermined threshold to determine whether or not the associated audio frame is likely to contain speech.

The speech detection unit 310 located in the feature extraction module 280, produces a feature-vector for each audio frame. In its most basic form this is a simple flag that indicates whether or not speech is present. Data corresponding to the harmonic index for each frame could also potentially be supplied as feature-vector data. Alternative embodiments of the speech detection unit 310 might output a feature-vector comprising the FFT coefficients for each audio frame, in which case the processing to determine the harmonic index and the likelihood of speech being present would be carried out in the metadata extraction module 290. The feature extraction module 280 could include an additional unit 330 for audio frame processing to detect musical sequences or pauses in speech.

The face detection unit 320 located in the feature extraction module 280, analyses video images to determine whether or not a human face is present. This unit implements an algorithm to detect faces such as the FaceIt® algorithm produced by the Visionics Corporation and commercially available at the priority date of this patent application. This face detection algorithm uses the fact that all facial images can be synthesised from an irreducible set of building elements. The fundamental building elements are derived from a representative ensemble of faces using statistical techniques. There are more facial elements than there are facial parts. Individual faces can be identified by the facial elements they possess and by their geometrical combinations. The algorithm can map an individual's identity into a mathematical formula known as a "faceprint". Each facial image can be compressed to produce a faceprint of around 84 bytes in size. The face of an individual can be recognised from this faceprint regardless of changes in lighting or skin tone, facial expressions or hairstyle and in the presence or absence of spectacles. Variations in the angle of the face presented to the camera can be up to around 35° in all directions and movement of faces can be tolerated.

The algorithm can therefore be used to determine whether or not a face is present on an image-by-image basis and to determine a sequence of consecutive images in which the same faceprint appears. The software supplier asserts that faces which occupy as little as 1% of the image area can be recognised using the algorithm.

The face detection unit 320 outputs basic feature-vectors 355 for each image comprising a simple flag to indicate whether or not a face has been detected in the respective image. Furthermore, the faceprint data for each of the detected faces is output as feature-vector data 355, together with a key or lookup table which relates each image in which at least one face has been detected to the corresponding detected faceprint(s). This data will ultimately provide the editor with the facility to search through and select all of the recorded video images in which a particular faceprint appears.

The right hand side of FIG. 5 shows that the metadata extraction module 290 of the video camera 210, comprises a hue histogram statistics unit 350, an "activity" calculation unit 360, a sub-shot segmentation unit 370 and a change detector 380.

The hue histogram statistics unit 350 uses the feature vector data 355 for the hue image property. It develops a rolling average of hue histogram data and detects changes between a current hue histogram and the current value of the rolling average. The rolling average can be, for example, an average of one second's worth of normalspeed-replayed video. The change detection can be by means of a single-valued difference $diff_F$ between the current hue histogram for a frame F and the current value of the rolling average. The derivation of a single valued difference figure is discussed below.

The hue histogram statistics unit 350 can also extract a representative image which reflects the predominant overall content of a shot. The hue histogram data included in feature-vector data 355 comprises a hue histogram for each image. This feature-vector data is combined with the sub-shot segmentation information output by sub-shot segmentation unit 370 to calculate the average hue histogram data for each shot.

The hue histogram information for each frame of the shot is used to determine an average histogram for the shot according to the formula:

$$h'_i = \frac{\sum_{F=1}^{n_F} h_i}{n_F}$$

where i is an index for the histogram bins, $h'_i$ is the average frequency of occurrence of the hue value associated with the ith bin, $h_i$ is the hue value associated with the ith bin for frame F and $n_F$ is the number of frames in the shot. If the majority of the frames in the shot correspond to the same scene then the hue histograms for those shots will be similar in shape therefore the average hue histogram will be heavily weighted to reflect the hue profile of that predominant scene.

The representative image is extracted by performing a comparison between the hue histogram for each frame of a shot and the average hue histogram for that shot. A singled valued difference $diff_F$ is calculated according to the formula:

$$diff_F = \sqrt{\sum_{i=1}^{nbins} (h'_i - h_i)^2}$$

For each frame F ($1 \leq F \leq n_F$) of a shot, one frame from the $n_F$ frames is selected which has the minimum value of $diff_F$. The above formula represents the preferred method for calculating the single valued difference; however it will be appreciated that alternative formulae can be used to achieve the same effect. An alternative would be to sum the absolute value of the difference ($h'_i - h_i$), to form a weighted sum of differences or to combine difference values for each image property of each frame. The frame with the minimum difference will have the hue histogram closest to the average hue histogram and hence it is preferably selected as the representative keystamp (RKS) image for the associated shot. The frame for which the minimum difference is smallest can be considered to have the hue histogram which is closest to the average hue histogram. If the value of the minimum difference is the same for two frames or more in the same shot then there are multiple frames which are closest to the average hue histogram however the first of these frames can be selected to be the representative keystamp. Although preferably the frame with the hue histogram that is closest to the average hue histogram is selected to be the RKS, alternatively an upper threshold can be defined for the single valued difference such that the first frame in the temporal sequence of the shot having a minimum difference which lies below the threshold is be selected as an RKS. It will be appreciated that, in general, any frame of the shot having a minimum difference which lies below the threshold could be selected as an RKS. The RKS images are the output of representative image extraction unit 350.

The RKS images can be used in the off-line edit suite as thumbnail images to represent the overall predominant contents of the shots. The editor can see the RKS at a glance and its availability will reduce the likelihood of having to replay a given shot in real time.

The "activity" calculation unit 360 uses the hue feature-vector data generated by the hue histogram calculation unit 300 to calculate an activity measure for the captured video images. The activity measure gives an indication of how much the image sequence changes from frame to frame. It can be calculated on a global level such as across the full temporal sequence of a shot or at a local level with respect to an image and its surrounding frames. In this embodiment the activity measure is calculated from the local variance in the hue values. It will be appreciated that the local variance of other image properties such as the luminosity could alternatively be used to obtain an activity measure. The advantage of using the hue is that the variability in the activity measure due to changes in lighting conditions is reduced. A further alternative would be to use the motion vectors to calculate an activity measure.

The "activity" calculation unit 360 serves to measure the activity level in the audio signal associated with the video images. It uses the feature-vectors produced by the speech detection unit 310 and performs processing operations to identify temporal sequences of normal speech activity, to identify pauses in speech and to distinguish speech from silence and from background noise. The volume of the sound is also used to identify high audio activity. This volume-based audio activity information is particularly useful for identifying significant sections of the video footage for sporting events where the level of interest can be gauged by the crowd reaction.

The sub-shot segmentation module uses the feature vector data 355 for the hue image property to perform sub-shot segmentation. The sub-shot segmentation is performed by calculating the element-by-element difference between the hue histograms for consecutive images and by combining these differences to produce a single valued difference. A scene change is flagged by locating an image with a single valued-difference that lies above a predetermined threshold.

Similarly a localised change in the subject of a picture, such as the entry of an additional actor to a scene, can be detected by calculating the single-valued difference between the hue histogram of a given image and a hue histogram representing the average hue values of images from the previous one second of video footage.

The change detector 380 detects changes in the outputs of the activity calculation unit 360 and the sub-shot segmentation unit 370, for example by comparing the current value of a particular metric with a rolling average of the values corresponding to the last (say) one second of normal-replay-speed video.

It has been noted above that the hue histogram statistics unit 350 detects changes in the hue histogram data. By detecting these changes, it is possible to detect instances in the video sequence which are perceived to be more significant or to have a higher information content than periods of the video sequence where very little changes from frame to frame.

Although the description of FIGS. 3 to 5 has covered a system in which the metadata derivation is partitioned between the camera and a separate processing apparatus, the skilled man will of course appreciate that the metadata derivation could take place in a single apparatus or be partitioned between apparatuses in a different manner.

FIG. 6 (shown as FIGS. 6a to 6i) is a schematic chart showing information levels within an example video sequence.

Figure 6A:
FIG. 6 (shown as FIGS. 6a to 6i) is a schematic chart showing information levels within an example video sequence.

FIG. 6a schematically illustrates a video sequence, with time running from left to right.

Figure 6B:
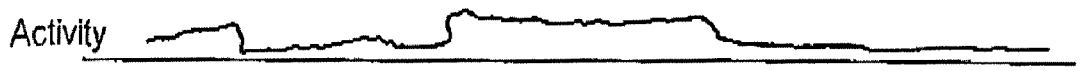
Figure 6C:
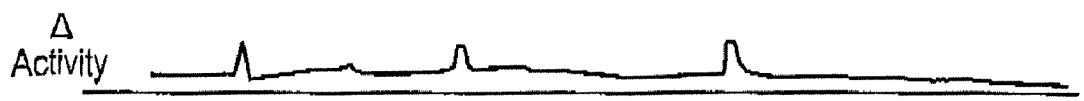
Figure 6D:

FIG. 6b schematically illustrates an activity measure within the video sequence, as derived by the activity calculation unit 360. FIG. 6c schematically represents a detection of changes within that activity value as detected by the change detector 380.

Figure 6E:

FIG. 6c represents a speech detection flag indicating the likely presence of speech as detected by the speech detector 310. FIG. 6e schematically indicates changes in the speech detection flag, as detected by the change detector 380.

Figure 6F:

FIG. 6f schematically illustrates changes in the hue histogram data (in this embodiment, changes in the single-valued difference value $\text{diff}_F$) with time, as detected by the hue histogram statistics unit 350.

Figure 6G:
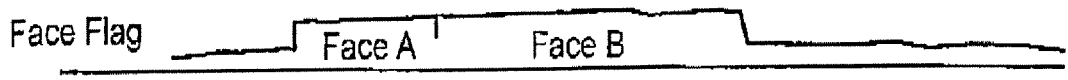
Figure 6H:
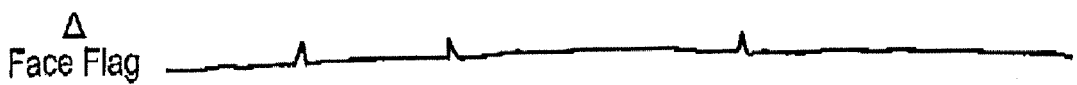
Figure 6I:
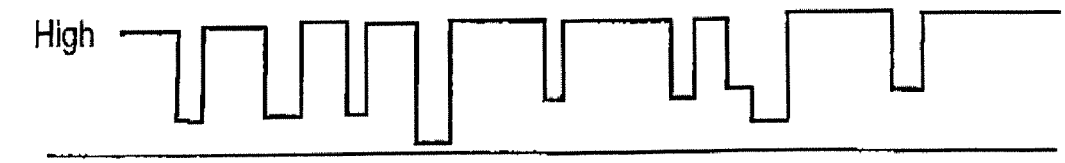

FIG. 6g schematically illustrates face flag data as detected by the face detector 320. FIG. 6h schematically illustrates changes in the face flag data as detected by the change detector 380.

In the present embodiment, it is the change data (FIGS. 6c, 6e, 6f and 6h) which is considered to represent information content by which the shuttle or jog operation is controlled. So, portions of the video/audio material in which changes are taking place close to one another are replayed more slowly, and portions where changes are more sparsely distributed are replayed more quickly.

The replay speed can be set at, for example, n information "events" per unit time, where an event is defined as at least a threshold change in one of the information measures defined above. The "unit time" is defined by an inverse relationship to the rotary position of the shuttle wheel 60, so that as the shuttle wheel 60 is rotated further the "unit time" becomes shorter.

Alternatively, the nature of the replayed information can be changed as the wheel 60 is rotated. For example, at small angular displacements of the wheel, information events where the information content exceeds a small threshold can be replayed. As the wheel is rotated further the threshold increases until, at large rotations, only the most significant events are replayed. This gives a particular flexibility to the operation of the apparatus.

As well as displaying frames at which an information event occurs, the apparatus can be arranged to display at least, say, the m frames either side of such a frame, or the m frames following such a frame, where m is selected so as to allow sufficient frames for the user to comprehend the scene before the replay moves on to the next scene.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A video replay apparatus comprising:
   a content storage device;
   a replay controller configured to control a replay of video material from said content storage device;
   said replay controller being configured to control the replay in accordance with metadata associated with said video material, the metadata defining image activity within said video material and defining an information event within said video material as a threshold change in the image activity; and
   said replay controller is further configured to replay said video material with a pre-defined number of information events in a unit of time in a replayed sequence.

2. The video replay apparatus according to claim 1, further comprising a user control, in which said replay controller is operable to vary a threshold information content to define an information event within said video material, in response to said user control.

3. The video replay apparatus according to claim 1, further comprising a user control, in which said pre-defined number is defined by said user control.

4. The video replay apparatus according to claim 1, in which said metadata defining said information content of said video material comprises data defining a presence of faces within said video material.

5. The video replay apparatus according to claim 1, in which said metadata defining said information content of said video material comprises data defining a presence of speech within audio material associated with said video material.

6. The video replay apparatus according to claim 1, in which said metadata defining said information content of said video material comprises data defining colour content of said video material.

7. The video replay apparatus according to claim 1, further comprising an information content analyzer configured to derive said metadata from said video material and/or associated audio material.

8. A method of replaying stored video material, said method comprising:
  storing video material;
  controlling a replay of said video material in accordance with metadata associated with said video material, the metadata defining image activity within said video material and defining an information event within said video material as a threshold change in the image activity; and
  replaying said video material with a pre-defined number of information events in a unit of time in a replayed sequence.

9. A computer-readable recording medium for storing a computer program that includes instructions which when executed on a computer cause the computer to execute a method comprising:
  storing video material;
  controlling a replay of said video material in accordance with metadata associated with said video material, the metadata defining image activity within said video material and defining an information event within said video material as a threshold change in the image activity; and
  replaying said video material with a pre-defined number of information events in a unit of time in a replayed sequence.

* * * * *